United States Patent
Misumi (10) Patent No.: US 11,987,335 B2
(45) Date of Patent: May 21, 2024

(54) ENGINE SPEED CONTROL DEVICE FOR VESSEL

(71) Applicant: HONDA MOTOR CO., LTD., Tokyo (JP)

(72) Inventor: Yoshiyuki Misumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 392 days.

(21) Appl. No.: 17/296,565

(22) PCT Filed: Nov. 30, 2018

(86) PCT No.: PCT/JP2018/044140
§ 371 (c)(1),
(2) Date: May 25, 2021

(87) PCT Pub. No.: WO2020/110280
PCT Pub. Date: Jun. 4, 2020

(65) Prior Publication Data
US 2022/0024552 A1  Jan. 27, 2022

(51) Int. Cl.
*B63H 21/21* (2006.01)
*B63H 20/02* (2006.01)
(Continued)

(52) U.S. Cl.
CPC ........... *B63H 21/213* (2013.01); *B63H 20/02* (2013.01); *F02D 29/02* (2013.01); *G05D 1/0011* (2013.01)

(58) Field of Classification Search
CPC .... B63H 21/21; B63H 21/213; B63H 21/216; B63H 23/00; B63H 23/28; B63H 20/00;
(Continued)

(56) References Cited

U.S. PATENT DOCUMENTS 5,474,480 A * 12/1995 Schwarz ................ B63H 23/26
440/86
2005/0245145 A1  11/2005 Takada et al.
(Continued)

FOREIGN PATENT DOCUMENTS

| JP | 2005-315219 | 11/2005 |
| JP | 2006-035884 | 2/2006 |
| JP | 2008-163863 | 7/2008 |

OTHER PUBLICATIONS

International Search Report and Written Opinion for International Application No. PCT/JP2018/044140 mailed on Jan. 15, 2019, 9 pages.

*Primary Examiner* — Daniel V Venne
(74) *Attorney, Agent, or Firm* — Amin, Turocy & Watson, LLP (57) ABSTRACT

An engine speed control device for a vessel in which a plurality of outboard motors are mounted on a hull, has a control unit that performs control, on the basis of an operation of one switch, so as to set engines of the outboard motors to a synchronous mode in which the engines have an identical engine speed, wherein the control unit determines in advance an engine to serve as a reference among the engines of the outboard motors, and automatically changes the mode to the synchronous mode in which the engine speeds of engines other than the reference engine become equal to the engine speed of the reference engine when all the engines satisfy a condition to transit to the synchronous mode.

6 Claims, 7 Drawing Sheets

(51) Int. Cl.
*F02D 29/02* (2006.01)
*G05D 1/00* (2024.01)

(58) Field of Classification Search
CPC .................. B63H 20/003; B63H 20/02; B63H 2020/003; B63H 25/42; F02D 11/105; F02D 29/02; F02D 2200/60; F02D 25/02; G05D 1/0011
USPC ......................................... 440/1, 2, 3, 84, 87
See application file for complete search history.

(56) References Cited

U.S. PATENT DOCUMENTS

2006/0019552 A1    1/2006  Okuyama
2008/0160845 A1    7/2008  Kado et al.

\* cited by examiner

ENGINE SPEED CONTROL DEVICE FOR VESSEL

TECHNICAL FIELD

The present invention relates to a marine vessel engine rotational speed control device (an engine speed control device for a vessel), the marine vessel including a plurality of outboard motors mounted on a hull.

BACKGROUND ART

When a marine vessel having a plurality of outboard motors mounted on a rear portion of the hull is cruising on the sea (in water), if variations occur in the engine rotational speeds of the respective outboard motors and the propulsive forces thereof differ from each other, traveling of the vessel in a straightforward manner deteriorates.

For this reason, a vessel operator is required to individually adjust the engine rotational speeds of the outboard motors to synchronize (match) them with each other, and such an operation tends to be complicated.

In Japanese Laid-Open Patent Publication No. 2005-315219 (hereinafter, referred to as JPA 2005-315219), a synchronous mode technology is disclosed in which the speed of the vessel and the engine rotational speeds of a plurality of outboard motors are detected, and when the speed of the vessel is greater than or equal to a specified value (at a high propulsive force), the engine rotational speeds of the outboard motors are synchronized with a highest engine rotational speed, whereas when the speed of the vessel is less than the specified value (at a low propulsive force), the engine rotational speeds of the outboard motors are synchronized with a lowest engine rotational speed.

In accordance with such a synchronous mode technology, the engine rotational speeds of the outboard motors can be automatically synchronized, operations related to the engine rotational speed control when a plurality of outboard motors are used can be simplified, and from the fact that the engine rotational speeds to be synchronized are switched between a high propulsive force side and a low propulsive force side, a feeling concerned with handling (maneuvering) of the vessel can be improved without imparting a sense of discomfort to the operator.

SUMMARY OF INVENTION

Incidentally, since the engine rotational speeds of the outboard motors are controlled by a rotating (tilting) operation of respective left and right levers, in the above-described background technology, when the engine rotational speeds are synchronized, it is necessary to align the rotational (tilted) positioning of the respective left and right levers to thereby set the synchronous mode, and in this respect, a problem arises in that the operation is complicated and time-consuming.

The present invention has been devised taking into consideration the aforementioned problems, and has the object of providing a marine vessel engine rotational speed control device, which is capable of placing a plurality of outboard motors in a synchronous mode on the basis of a simple operation.

One aspect of the present invention is characterized by a marine vessel engine rotational speed control device, the marine vessel including a plurality of outboard motors which are mounted on a hull and each of which is equipped with an engine, the marine vessel engine rotational speed control device comprising a control unit configured to cause each of the engines of the plurality of outboard motors to transition to a synchronous mode in which the engines are controlled at a same engine rotational speed, based on operation of a change in control, wherein the control unit determines beforehand an engine to serve as a reference from among the engines of the plurality of outboard motors, and when all of the engines have satisfied a transitioning condition to transition to the synchronous mode, the control unit automatically causes transitioning to the synchronous mode in which engine rotational speeds of the engines other than the engine serving as the reference are controlled at an engine rotational speed of the engine serving as the reference, and automatically cancels the synchronous mode when at least one engine from among all of the engines has satisfied a cancellation condition to cancel the synchronous mode.

According to the present invention, the synchronous mode is capable of being set on the basis of a simple operation. As a result, cruising navigation or the like can be stably executed based on a simple operation without imparting a sense of discomfort to the operator.

Further, when a plurality of outboard motors are mounted, all of the plurality of outboard motors are set in conformity with the same engine rotational speed, and therefore, without a sense of disparity between the engines, the sound quality (tone) of the engines is improved, and the auditory impression of the vessel occupant or the like is improved. Moreover, traveling of the vessel in a straightforward manner is improved.

DESCRIPTION OF EMBODIMENTS

Hereinafter, a description will be presented with reference to the accompanying drawings concerning a marine vessel engine rotational speed control device according to the present invention.

Figure 1:
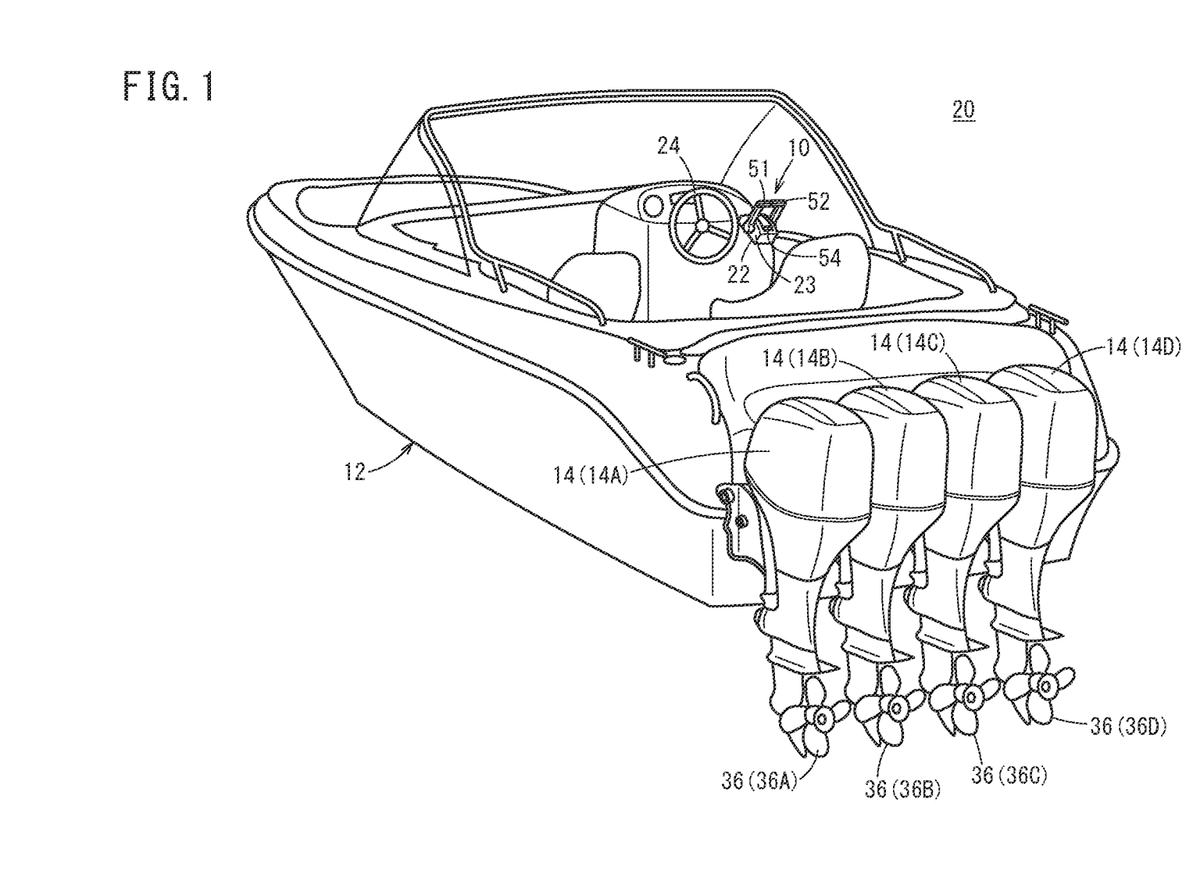
FIG. 1 is a schematic perspective view of a marine vessel equipped with a marine vessel engine rotational speed control device according to a present embodiment.

FIG. 1 is a schematic perspective view of a marine vessel 20 equipped with a marine vessel engine rotational speed control device 10 according to a present embodiment.

Figure 2:
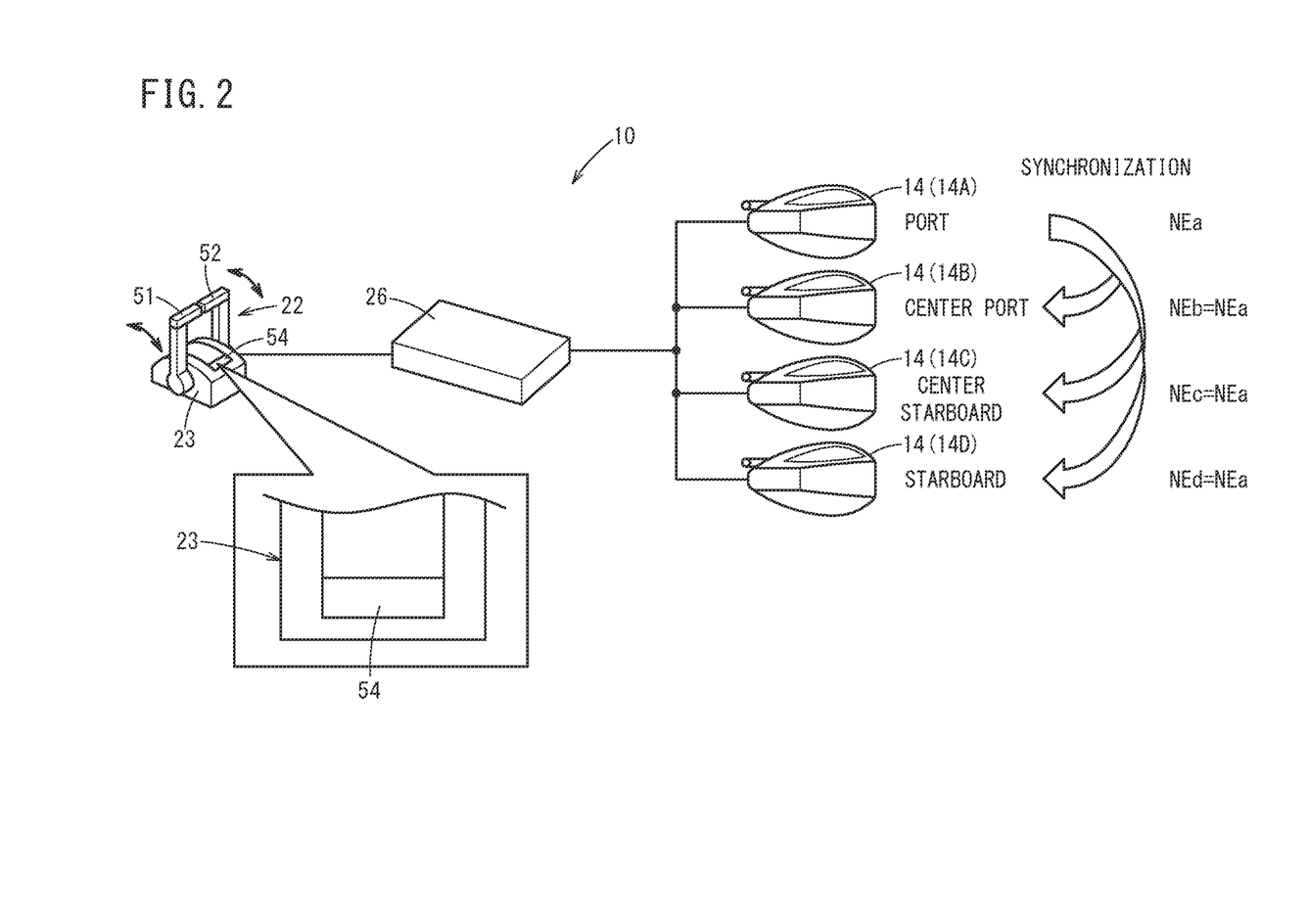
FIG. 2 is a schematic configuration diagram of the marine vessel engine rotational speed control device according to the present embodiment.

FIG. 2 is a schematic configuration diagram of the marine vessel engine rotational speed control device 10 according to the present embodiment.

Figure 3:
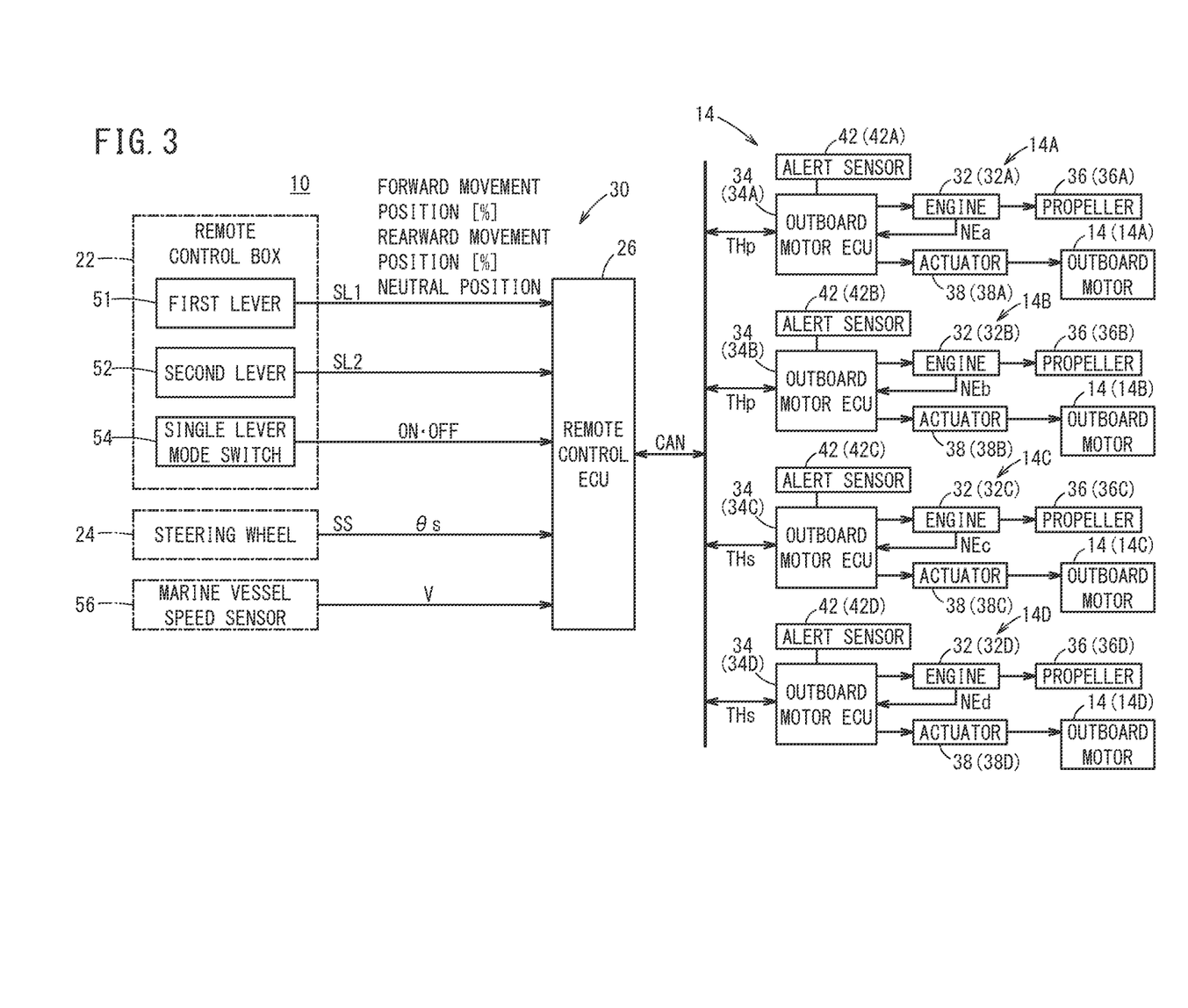
FIG. 3 is a schematic block diagram of a marine vessel drive system including the marine vessel engine rotational speed control device according to the present embodiment.

FIG. 3 is a schematic block diagram of a drive system 30 for the marine vessel 20 including the marine vessel engine rotational speed control device 10 according to the present embodiment.

[Description of Configuration and Basic Operations]

As shown in FIG. 1, four outboard motors 14 (14A, 14B, 14C, and 14D) are mounted on the stern of a hull 12 of the marine vessel 20. Although the marine vessel 20 is one having four outboard motors mounted thereon, the present invention can be applied to a marine vessel equipped with a plurality of, namely, at least two outboard motors.

Concerning the outboard motors 14, a first outboard motor 14A (a port side outboard motor), a second outboard motor 14B (a port side center outboard motor), a third outboard motor 14C (a starboard side center outboard motor), and a fourth outboard motor 14D (a starboard side outboard motor), which are of the same configuration, are arranged in this order from a port side to a starboard side.

Since the first to fourth outboard motors 14A to 14D have the same configuration, in the event there is no need to distinguish between them, the motors will be described and referred to simply as outboard motors 14. Regarding engines (internal combustion engines) 32 (32A to 32D) and propellers (screws) 36 (36A to 36D), etc., which will be described in a similar manner to above, in the case there is no need to distinguish between individual ones, they will be described and referred to simply as engines 32 and propellers 36, respectively.

In the later-described synchronous mode, as shown by the wide curved arrows in FIG. 2, the first outboard motor 14A is treated as a master outboard motor (with an engine rotational speed of NEa), and the second to fourth outboard motors 14B to 14D are treated as slave outboard motors (with engine rotational speeds of NEb, NEc, and Ned respectively, which are set to the engine rotational speed NEa). However, the present invention can be applied to a situation in which any one of the outboard motors is treated as being the master outboard motor.

Each of the outboard motors 14 is equipped with an engine 32 in an upper portion, together with being equipped with a propeller 36 in a lower portion of the interior thereof. The propellers 36 are rotated by power of the engines 32 being transmitted thereto, and thereby cause the hull 12 to move forward or rearward.

Since the mechanical structural configuration of the outboard motors 14 is well known (refer to JPA2005-315219, etc.), details thereof are not shown. However, in the respective outboard motors 14, there are provided trim mechanisms for adjusting the angles of the outboard motors 14 during cruising, tilt mechanisms for raising the outboard motors 14 above the water surface at a time of anchoring, and so-called PTT (power trim tilt) mechanisms.

As shown in FIG. 3, the marine vessel engine rotational speed control device 10, which includes the drive system 30 for the marine vessel 20, basically comprises a remote control box 22, a steering wheel 24, a remote control ECU 26, and outboard motor ECUs 34 (34A to 34D) which are ECUs within the respective outboard motors 14.

The first to fourth outboard motors 14A to 14D are equipped, respectively, with the engines 32 (32A to 32D), the outboard motor ECUs 34 (34A to 34D) serving as control units, the propellers 36 (36A to 36D) which are rotated by the engines 32, actuators 38 (38A to 38D), the outboard motors 14 themselves (14A to 14D) which are driven by the actuators 38, and alert sensors 42 (42A to 42D).

Each of the ECUs (electronic control units) such as the outboard motor ECUs 34, etc., includes a computer (an input unit, a computation unit, a memory, and an output unit), and a CPU thereof executes a program stored in the memory such as a ROM or the like based on various inputs, whereby the ECUs operate as function realization units (function realization means) that realize various functions.

The remote control box 22, the steering wheel 24, and a marine vessel speed sensor (speedometer) 56 are electrically connected to the remote control ECU 26 through signal lines. The outboard motor ECUs 34 and the remote control ECU 26 are electrically connected to each other through a communication line such as a CAN or the like.

As shown in FIG. 1, the steering wheel 24 is arranged in front of a vessel operator's seat.

The steering wheel 24 outputs a steering signal SS indicating a steering angle θs corresponding to an angle of rotation of the steering wheel 24, which is operated by the vessel operator, to the remote control ECU 26 through a signal line (see FIG. 3).

The remote control ECU 26 to which the steering signal SS has been input outputs information of the steering angle θs as represented by the steering signal SS to all of the outboard motor ECUs 34 through the communication line.

The respective outboard motor ECUs 34, to which the information of the steering angle θs has been input, swing the respective outboard motors 14 to the left or right via the actuators 38 in accordance with the information of the steering angle θs, and implement steering in the same direction.

The marine vessel speed sensor 56 outputs a signal corresponding to the marine vessel speed V of the hull 12 to the remote control ECU 26 through the signal line. The remote control ECU 26 outputs information of the marine vessel speed V to all of the outboard motor ECUs 34 through the communication line. All of the outboard motor ECUs 34 store the information of the marine vessel speed V in their memories and perform monitoring.

The remote control box 22 is disposed in close proximity to the vessel operator's seat of the hull 12, and in the present embodiment, the remote control box 22 is arranged on the right side of the steering wheel 24 when viewed from the vessel operator's seat.

The remote control box 22 is constituted by a box portion 23 (see FIG. 2) that is fixed to the hull 12, and a first lever 51 (a lever arranged on the left side in the direction of forward navigation) and a second lever 52 (a lever arranged on the right side in the direction of forward navigation), which extend upwardly from both side surfaces of the box portion 23, and form an inverted U-shape when placed in alignment. The first lever 51 and the second lever 52 themselves are L-shaped, respectively.

The first lever 51 and the second lever 52 are levers for performing shifting and throttling operations, and in the states shown in FIGS. 1 and 2, the bottom portion of the U-shape (the upper portion shown in FIGS. 1 and 2) is gripped by the right hand, and is operated to be rotated (tilted) forward or rearward (in the directions of the arrows (see FIG. 2)), whereby the levers can be positioned in the forward movement position, the neutral position, and the rearward movement position. The first lever 51 and the second lever 52 can be individually operated to rotate.

Moreover, the remote control box 22 can be arranged and fixed on the left side of the steering wheel 24 when viewed from the vessel operator's seat, instead of on the right side, and in that case, the first lever 51 and the second lever 52 can be gripped by the left hand.

In the interior of the box portion 23, although not shown, electrical circuits including rotary encoders for outputting signals of the respective angles corresponding to the rotational (tilted) positions of the first lever 51 and the second lever 52 in the directions of the arrows, and rotation mechanisms, are provided.

As shown in the enlarged balloon-shaped view in FIG. 2, in the box portion 23 of the remote control box 22, apart from the first lever 51 and the second lever 52, there is provided a single lever mode switch (ON/OFF switch) 54 of a push button switch (the switch need not necessarily be a push button switch), which outputs an ON/OFF (ON or OFF) signal in order to carry out switching to the single lever mode (single lever navigation mode) concerned with controlling the main components of the present embodiment.

More specifically, the single lever mode switch 54 is integrally provided on the remote control box 22, together with the first lever 51 and the second lever 52.

The single lever mode switch 54 is one operating member concerned with operation of a change in the control, and is not limited to being provided on the remote control box 22, and for example, may be provided on the steering wheel 24 or on a non-illustrated meter panel (including a touch panel) or the like.

As noted previously, the first lever 51 is freely rotated (tilted) in forward and rearward directions by an operation (manual operation) performed by the hand of the vessel operator, and in the case of being in a normal mode (normal mode navigation) in which an OFF signal is output from the single lever mode switch 54 (single switch), a first lever signal SL1 indicating the forward movement position (lever target throttle opening THp) [deg], the rearward movement position (lever target throttle opening THp) [deg], and the neutral position corresponding to the rotational (tilted) position of the first lever 51 is output through the signal line.

Moreover, the forward movement position is a position in which the rotational (tilted) position of the first lever 51 is on the front side (a side in the direction of forward movement of the marine vessel 20) of the neutral position, and the rearward position is a position in which the rotational (tilted) position of the first lever 51 is on the rear side (a side in the direction of rearward movement of the marine vessel 20) of the neutral position.

The remote control ECU 26 to which the first lever signal SL1 is input through the signal line transmits the lever target throttle opening THp, which is information included in the first lever signal SL1, to the outboard motor ECU 34A and the outboard motor ECU 34B via the communication line (see FIG. 3).

The outboard motor ECU 34A and the outboard motor ECU 34B to which the lever target throttle opening THp is transmitted, respectively control the throttle openings THa and THb of the first outboard motor 14A and the second outboard motor 14B so as to become the lever target throttle opening THp.

In this manner, the engine rotational speeds NEa and NEb of the first outboard motor 14A and the second outboard motor 14B are controlled so as to become the rotational speed NEp corresponding to the lever target throttle opening THp.

Similarly, the second lever 52 is freely rotated (tilted) in forward and rearward directions by an operation (manual operation) performed by the hand of the vessel operator, and in the case that an OFF signal is output from the single lever mode switch 54, a second lever signal SL2 indicating the forward movement position (lever target throttle opening THs) [deg], the rearward movement position (lever target throttle opening THs) [deg], and the neutral position corresponding to the rotational (tilted) position of the second lever 52 is output through the signal line.

In this case as well, the forward movement position is a position in which the rotational (tilted) position of the second lever 52 is on the front side (a side in the direction of forward movement of the marine vessel 20) of the neutral position, and the rearward position is a position in which the rotational (tilted) position of the second lever 52 is on the rear side (a side in the direction of rearward movement of the marine vessel 20) of the neutral position.

The remote control ECU 26 to which the second lever signal SL2 is input through the signal line transmits the lever target throttle opening THs, which is information included in the second lever signal SL2, to the outboard motor ECU 34C and the outboard motor ECU 34D via the communication line.

The outboard motor ECU 34C and the outboard motor ECU 34D to which the lever target throttle opening THs is transmitted, respectively control the throttle openings THc and THd of the third outboard motor 14C and the fourth outboard motor 14D so as to become the lever target throttle opening THs.

In this manner, the engine rotational speeds NEc and NEd of the third outboard motor 14C and the fourth outboard motor 14D are controlled so as to become the rotational speed NEs corresponding to the lever target throttle opening THs.

Moreover, in the case of the normal mode, such as when the marine vessel is cruising in a straightforward manner, the first lever 51 and the second lever 52 are simultaneously operated by being gripped by one hand of the vessel operator. At this time, both rotational (tilted) positions, i.e., the forward movement position [%] and the rearward movement position [%], of the first lever 51 and the second lever 52 are maintained at substantially the same positions.

Furthermore, since there is a clicking feeling and play in the neutral position, the first lever 51 and the second lever 52 can be easily operated (set) to the neutral position simultaneously. Moreover, the first lever 51 and the second lever 52 are formed in a manner so as to be returned to the neutral position by a spring force, in a state in which they are not operated or in a state in which the gripping force is weak.

On the other hand, while the single lever mode switch (ON/OFF switch) 54 concerned with the main configuration of the present embodiment is pressed by (a manual operation of) the vessel operator, and the ON signal is output, and when the first lever 51 and the second lever 52 are placed in the neutral position by the vessel operator, the remote control ECU 26 transitions to the single lever mode (single lever asynchronous mode, single lever navigation mode), which will be described in detail later.

In FIG. 3, the alert sensors 42 (42A to 42D) monitor the oil temperature, the water temperature (engine temperature), etc., of the engines 32, and transmit such values to the outboard motor ECUs 34 (34A to 34D).

An ignition switch is provided at an appropriate position of each of the outboard motors 14A to 14D, and the respective components of the outboard motor ECUs 34 and the engines 32 are started by operating the ignition switch from OFF to ON, whereby supply of electrical power from a non-illustrated battery to the respective components is initiated. The engines 32, while being started (while operating), are stopped by operation of the ignition switch from ON to OFF.

[Description by Way of State Transition Diagram of Normal Mode and Single Lever Mode]

Figure 4:
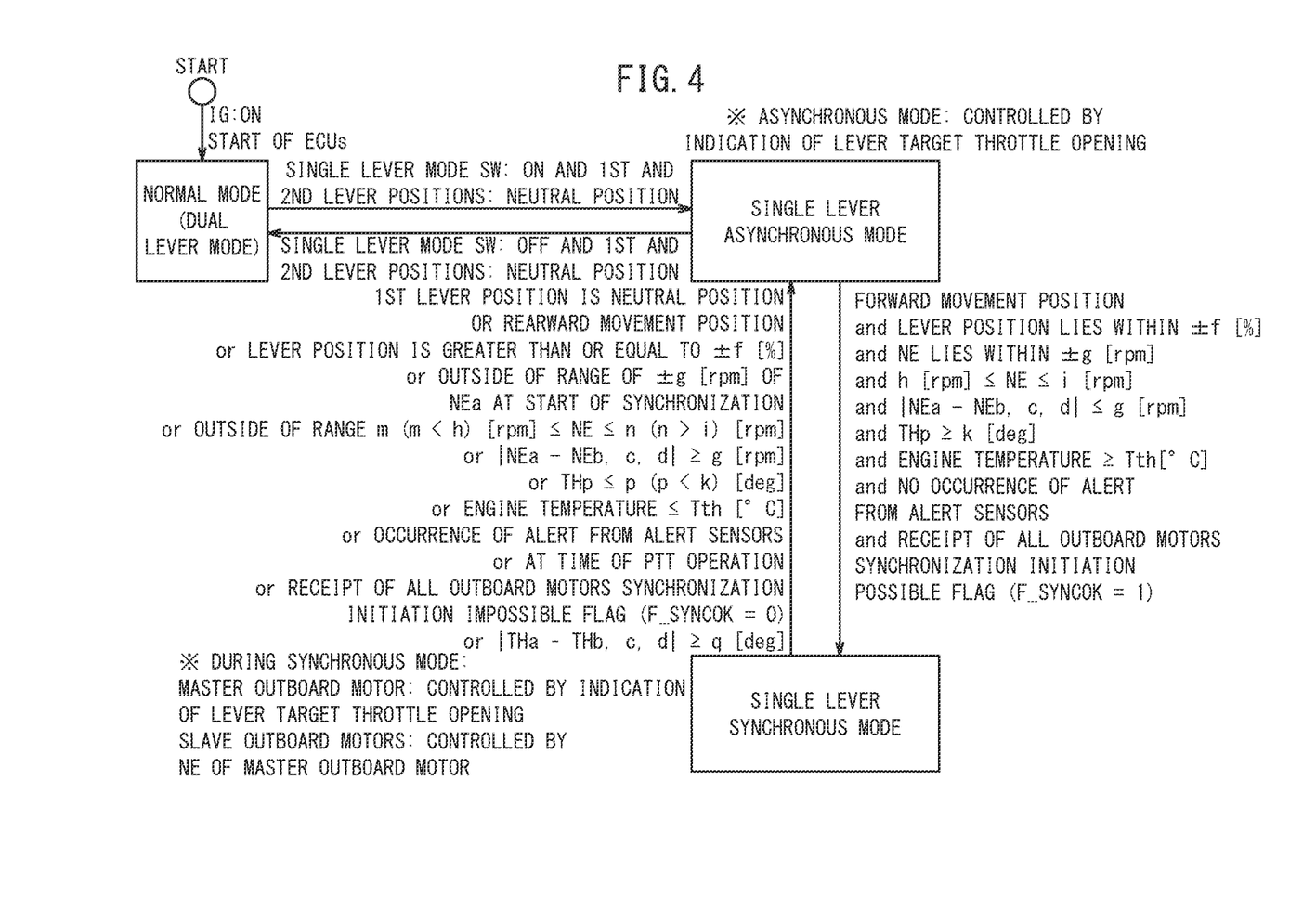
FIG. 4 is a state transition diagram of a normal mode, a single lever asynchronous mode, and a single lever synchronous mode.

Next, a description will be given using the state transition diagram of FIG. 4 concerning operations of the single lever mode (single lever navigation mode) concerned with the main configuration of the marine vessel engine rotational speed control device 10 of the present embodiment.

The programs concerned with the state transition are stored in the outboard motors ECUs 34A to 34D.

When the ignition switch is turned from OFF to ON and the engines 32 are started, electrical power is supplied to all of the ECUs, and the marine vessel engine rotational speed control device 10 is started.

In this case, the remote control box 22 is initialized to the normal mode (dual lever mode) in accordance with a default setting.

In the normal mode, the marine vessel 20 is navigated according to the respective rotational (tilted) positions of the first lever 51 and the second lever 52.

When in the normal mode, if the first lever 51 and the second lever 52 are operated to the neutral position, and the single lever mode switch 54 is pressed and held and turned ON, then through the remote control ECU 26, the states of the outboard motor ECUs 34 (34A to 34D) transition from the normal mode to the single lever asynchronous mode.

In the single lever asynchronous mode, the lever target throttle openings THp, THs are transmitted from the first lever 51 and the second lever 52 to the outboard motor ECUs 34A, 34B, 34C, and 34D through the remote control ECU 26, and the outboard motor ECUs 34A, 34B, 34C, and 34D control their own throttle valves, in a manner so that the throttle openings THa, THb, THc, and THd of the engines 32A, 32B, 32C, and 32D become the lever target throttle openings THp of the first lever 51.

More specifically, in the single lever asynchronous mode, each of the outboard motor ECUs 34 controls its own throttle valve on the basis of the lever target throttle opening THp of the first lever 51, and the lever target throttle opening THs of the second lever 52 is not used in such a control. The same feature applies to the later-described single lever synchronous mode.

When it is confirmed by all of the outboard motor ECUs 34 that all of the conditions (first to ninth conditions) indicated below have been satisfied during maneuvering or navigation of the marine vessel in the single lever asynchronous mode, the states of the outboard motor ECUs 34 (34A to 34D) automatically transition to the single lever synchronous mode, which will be described in detail later.

First Condition: The positions of the first lever 51 and the second lever 52 are in the forward movement position.

Second Condition: The positions of the first lever 51 and the second lever 52 are within a variable range of ±f [%] (f, for example, is on the order of a few to several percent) within the past few to several seconds.

Third Condition: The engine rotational speeds NEa, NEb, NEc, and NEd are within a variable range of ±g [rpm] (g, for example, is on the order of a few to several hundred revolutions) within the past few to several seconds.

Fourth Condition: The engine rotational speeds NEa, NEb, NEc, and Ned lie within a range from being greater than or equal to a target engine rotational speed lower limit value NEll=h [rpm] (h>>g) to being less than or equal to a target engine rotational speed upper limit value NEul=i [rpm].

Fifth Condition: During the single lever asynchronous mode, a deviation (absolute value) between the engine rotational speed NEa of the outboard motor 14A, which serves as the master outboard motor, and the engine rotational speeds NEb, NEc, and NEd of the other outboard motors 14B to 14D, which serve as the slave outboard motors, is less than or equal to the value g [rpm] (|NEa−NEb|≤g [rpm], |NEa−NEc|≤g [rpm], and |NEa−NEd|≤g [rpm]).

For example, in the case that propellers 36 having different pitches are mounted on the first outboard motor 14A and the fourth outboard motor 14D, or in the case of cruising in rough waves, since the condition of |NEa−NEd|>g [rpm] is brought about, transitioning to the synchronous mode does not take place.

Sixth Condition: The lever target throttle opening THp [deg] is greater than or equal to k [deg] (where k, for example, is on the order of a few to several degrees).

Seventh Condition: The respective engine temperatures of the engines 32A to 32D are greater than or equal to a threshold temperature Tth [° C.], and all of the engines 32A to 32D are warmed up.

Eighth Condition: the occurrence of an alert is not detected by all of the alert sensors 42. For example, in the case that the trim positions of the outboard motors 14A to 14D differ from one another, an alert will be generated, and therefore, transitioning to the synchronous mode does not take place.

Ninth Condition: The outboard motors ECUs 34A to 34D of all of the outboard motors 14A to 14D have received a synchronization initiation possible flag (F_SYNCOK=1) which is output upon it being confirmed by the outboard motor ECUs 34A to 34D of the respective outboard motors 14A to 14D that the above-described first to eighth conditions have been satisfied.

When all of the above-described first to ninth conditions have been satisfied, the outboard motors 14 undergo a transition from the single lever asynchronous mode to the single lever synchronous mode.

In the single lever synchronous mode, the throttle valve of the outboard motor 14A serving as the master outboard motor is controlled by the lever target throttle opening THp of the first lever 51, and in the outboard motors 14B to 14D serving as the slave outboard motors, the throttle openings THb, THc, and THd are controlled in a manner so that the engine rotational speeds NEb to NEd become the same as the engine rotational speed NEa of the outboard motor 14A (FIG. 2).

More specifically, the engine rotational speed NEa of the engine 32A of the outboard motor 14A is controlled by the outboard motor ECU 34A to the engine rotational speed NEa in accordance with the lever target throttle opening THp of the first lever 51. On the other hand, the throttle openings THb, THc, and THd are feedback-controlled in a manner so that the engine rotational speeds NEb, NEc, and NEd of the engines 32B to 32D of the remaining outboard motors 14B to 14D become the same as the engine rotational speed NEa of the engine 32A of the master outboard motor 14A.

In the foregoing manner, according to the above-described embodiment, when the engine rotational speeds NEa, NEb, NEc, and Ned of all of the outboard motors 14A to 14D are synchronized, then simply by pressing the single lever mode switch 54 and setting or operating the first lever 51 and the second lever 52 to the neutral position, thereafter, it is automatically determined whether or not all of the first to ninth conditions are satisfied, and when all of the conditions are satisfied, transitioning is automatically carried out from the single lever asynchronous mode to the single lever synchronous mode.

In this manner, the plurality of (in the present embodiment, four) outboard motors 14A to 14D can be driven in the synchronous mode by means of a simple operation.

The single lever synchronous mode is suitable to being applied, for example, at a time of cruising at a relatively high speed when the marine vessel 20 is heading toward a destination (a fishing ground) or when the marine vessel 20 is heading toward another destination (another fishing ground or a port from which the vessel departed), namely, at a time of so-called cruising navigation (for example, at a marine vessel speed V=around 20 [km/h]).

More specifically, the single lever synchronous mode in which the first to ninth conditions are satisfied can be changed from the asynchronous mode on the basis of a simple operation of turning the single lever mode switch 54 to ON. As a result, in accordance with the marine vessel engine rotational speed control device 10 according to the present embodiment, based on a simple operation, cruising navigation and the like can be stably executed without imparting a sense of discomfort.

Further, when the plurality of (in the present embodiment, four) outboard motors are mounted, all of the engines 32A to 32D of the four outboard motors 14A to 14D are set in conformity at the same engine rotational speed NEa, and therefore, without a sense of disparity between the engines, the sound quality (tone) of the engines 32A to 32D is improved, and the auditory impression of the vessel occupant or the like is improved. Moreover, traveling of the vessel in a straightforward manner is improved.

When maneuvering (navigating) in the single lever synchronous mode, when any one of the eleventh to twenty-first conditions described below has been satisfied, a transition (returning) is made to the single lever asynchronous mode.

Eleventh Condition: When the position of the first lever 51 is switched from the forward movement position to the neutral position or the rearward movement position.

Twelfth Condition: When the position of the first lever 51 fluctuates within a range of greater than or equal to ±f [%], from the time at which the single lever synchronous mode is entered, and more specifically, from the time at which the single lever synchronous mode is initiated. For example, this condition corresponds to a case in which, in order to enter trolling navigation from cruising navigation (such as a fishing maneuver aimed at large fish by setting a fishing line adrift with bait or the like from a traveling vessel), the position of the first lever 51 is operated from the side of the forward movement position to the side of the neutral position.

Thirteenth Condition: When the engine rotational speed NEa of the first outboard motor 14A, which is the port side outboard motor, lies outside of the range of NEa±g [rpm] at the time when the single lever synchronous mode is initiated.

Fourteenth Condition: When at least one of the engine rotational speeds NEa, NEb, NEc, and NEd is less than or equal to m (m<h) [rpm] or greater than or equal to n (n>i) [rpm].

Fifteenth Condition: When a deviation (absolute value) between the engine rotational speed NEa of the outboard motor 14A, which serves as the master outboard motor, and the engine rotational speeds NEb, NEc, and NEd of the other outboard motors 14B to 14D, which serve as the slave outboard motors, has become greater than or equal to the value g [rpm] (|NEa−NEb|≥g [rpm], |NEa−NEc|≥g [rpm], and |NEa−NEd|≥g [rpm]).

For example, in the case that a sharp turn is made by steering the steering wheel 24 during cruising in the synchronous mode, a deviation of greater than or equal to g [rpm] occurs between the engine rotational speed NEa and the engine rotational speed NEd, and in this case, the synchronous mode is canceled, and therefore, ease of turning is assured.

Similarly, in the case of having made a jump during cruising in rough waves, since the deviation is increased momentarily (|NEa−NEd|≥g [rpm]), the synchronous mode is canceled.

Sixteenth Condition: When, in response to an operation of the first lever 51, the lever target throttle opening THp [deg] becomes less than or equal to p (p<k) [deg].

Seventeenth Condition: When the respective engine temperatures of the engines 32A to 32D become less than or equal to the threshold temperature Tth [° C.].

Eighteenth Condition: the occurrence of an alert is detected by any one of the alert sensors 42.

Nineteenth Condition: When operation of the PTT mechanism is detected. For example, in the case that a trim operation is performed by any one of the outboard motors 14, the synchronous mode is immediately canceled.

Twentieth Condition: When any one of the outboard motors ECUs 34A to 34D has received a synchronization initiation impossible flag (F_SYNCOK=0) which is output upon it being confirmed by any one of the outboard motor ECUs 34A to 34D of the respective outboard motors 14A to 14D that any one of the above-described eleventh to nineteenth conditions is not satisfied.

Twenty-First Condition: When a deviation (absolute value) between the throttle opening THa of the throttle valve of the outboard motor 14A, which serves as the master outboard motor, and the throttle openings THb, THc, and THd of the throttle valves of the other outboard motors 14B to 14D, which serve as the slave outboard motors, has become greater than or equal to q [deg] (|THa−THb|≥q [deg], |THa−THc|≥q [deg], or |THa−THd|≥q [deg]) (where q, for example, is on the order of a few to several degrees).

As was previously noted above, when any one of the eleventh to twenty-first conditions is satisfied, a transition (returning) from the single lever synchronous mode to the single lever asynchronous mode is made.

When all the aforementioned first to ninth conditions are satisfied during navigation or maneuvering in the single lever asynchronous mode that was transitioned to, transitioning to the single lever synchronous mode is automatically performed again. On the other hand, during navigation or maneuvering in the single lever asynchronous mode, with a simple operation of the first lever 51 and the second lever 52 being operated to the neutral position, and the single lever mode switch 54 being pressed and held and turned OFF, the states of the outboard motor ECUs 34 (34A to 34D) transition from the single lever asynchronous mode to the normal mode (dual lever mode) through the remote control ECU 26 (referred to as a twenty-second condition). [Description by way of Flowchart of Transitioning between Single Lever Asynchronous Mode and Single Lever Synchronous Mode]

Next, a description will be given with reference to FIGS. 5 to 7 concerning the conditions for transitioning between the single lever asynchronous mode and the single lever synchronous mode. In the flowchart, one cycle is executed in a relatively short time period, for example, a time period on the order of ms.

Programs concerned with the flowchart are stored in the outboard motors ECUs 34A to 34D, and executed by the CPUs of the outboard motors ECUs 34A to 34D.

In step S1, a determination is made as to whether or not the lever position of the first lever 51 is in the forward movement position.

In the case of being in the forward movement position (step S1: YES), then a determination is made in step S2 as to whether or not the single lever mode switch 54 is ON.

In the case of being ON (step S2: YES), then a determination is made in step S3 as to whether or not the alert sensors 42 have detected the occurrence of an abnormality (occurrence of an alert).

If the occurrence of an abnormality is not detected (step S3: NO), then in step S4, a determination is made as to whether or not the engines 32A to 32D have been warmed up (whether warming up is completed), based on whether or not the engine temperatures of all of the engines is greater than or equal to 52 [° C.].

In the case that the engines 32A to 32D have been warmed up (step S4: YES), then in step S5, a determination is made as to whether or not the starting determination process for the single lever synchronous mode has been completed.

If the starting determination process has not been completed (step S5: NO), the synchronous mode starting determination process in step S6 is executed.

Moreover, in the case of step S1: NO, step S2: NO, and step S4: NO, the process returns to step S1. In the case of step S3: YES, the process transitions to another process.

Figure 6:
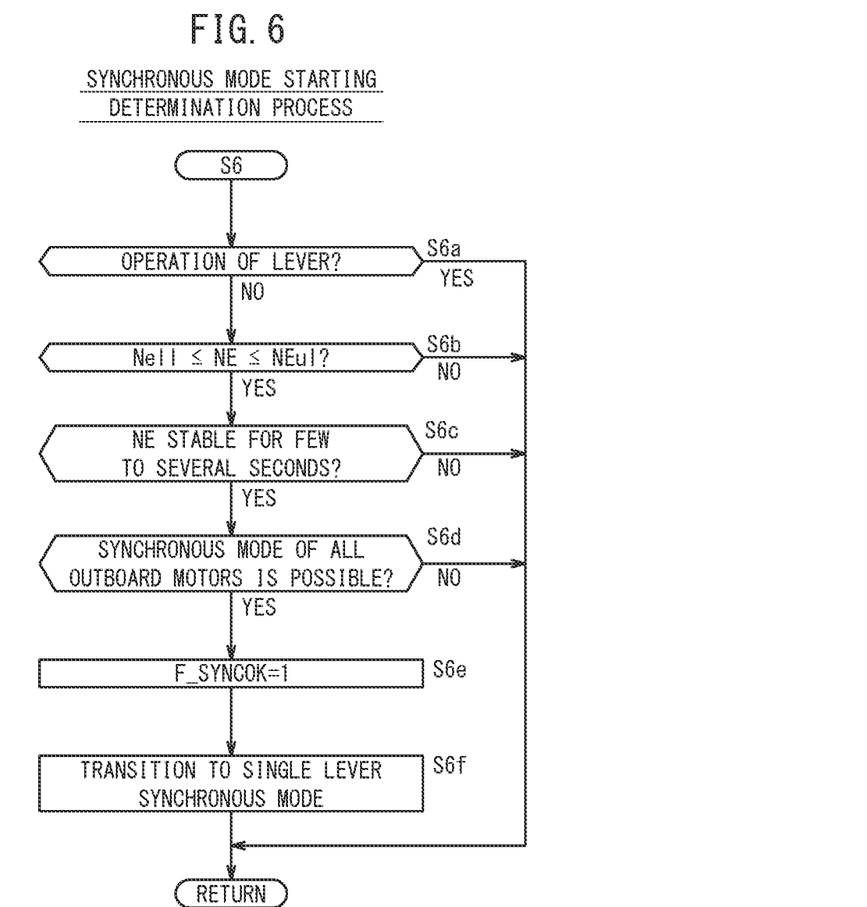
FIG. 6 is a flowchart showing details of a synchronous mode starting determination process shown in FIG. 5.

FIG. 6 shows a subroutine of the synchronous mode starting determination process in step S6.

In step S6a, a determination is made as to whether or not the first lever 51 is operated. More specifically, in step S6a, a determination is made as to whether or not the position of the first lever 51 fluctuates (including operation thereof) in excess of ±f [%] within the past few to several seconds.

In the case that the first lever 51 is not operated (step S6a: NO), then in step S6b, a determination is made as to whether or not the actual engine rotational speeds NEa, NEb, NEc, and NEd are at an engine rotational speed lying between the target engine rotational speed lower limit value NEll and the target engine rotational speed upper limit value NEul (Nell≤NE≤NEul).

In the case that the actual engine rotational speeds NEa, NEb, NEc, and NEd are engine rotational speeds lying between the target engine rotational speed lower limit value NEll and the target engine rotational speed upper limit value NEul (step S6b: YES), then in step S6c, a determination is made as to whether or not the respective engine rotational speeds NEa, NEb, NEc, and NEd have been stable over the past few to several seconds, more specifically, they have been within the variable range of ±g [rpm] within the past few to several seconds.

In the case that the respective engine rotational speeds NEa, NEb, NEc, and NEd have been stable over the past few to several seconds (step S6c: YES), then in step S6d, the outboard motor ECU 34A makes a determination as to whether or not all of the outboard motors 14A to 14D satisfy the condition under which the single lever synchronous mode is possible.

In the case that all of the outboard motors 14A to 14D satisfy the condition under which the single lever synchronous mode is possible (step S6d: YES), then in step S6e, the outboard motor ECU 34A sets the single lever synchronous mode initiation possible flag F_SYNCOK to F_SYNCOK=1.

Figure 5:
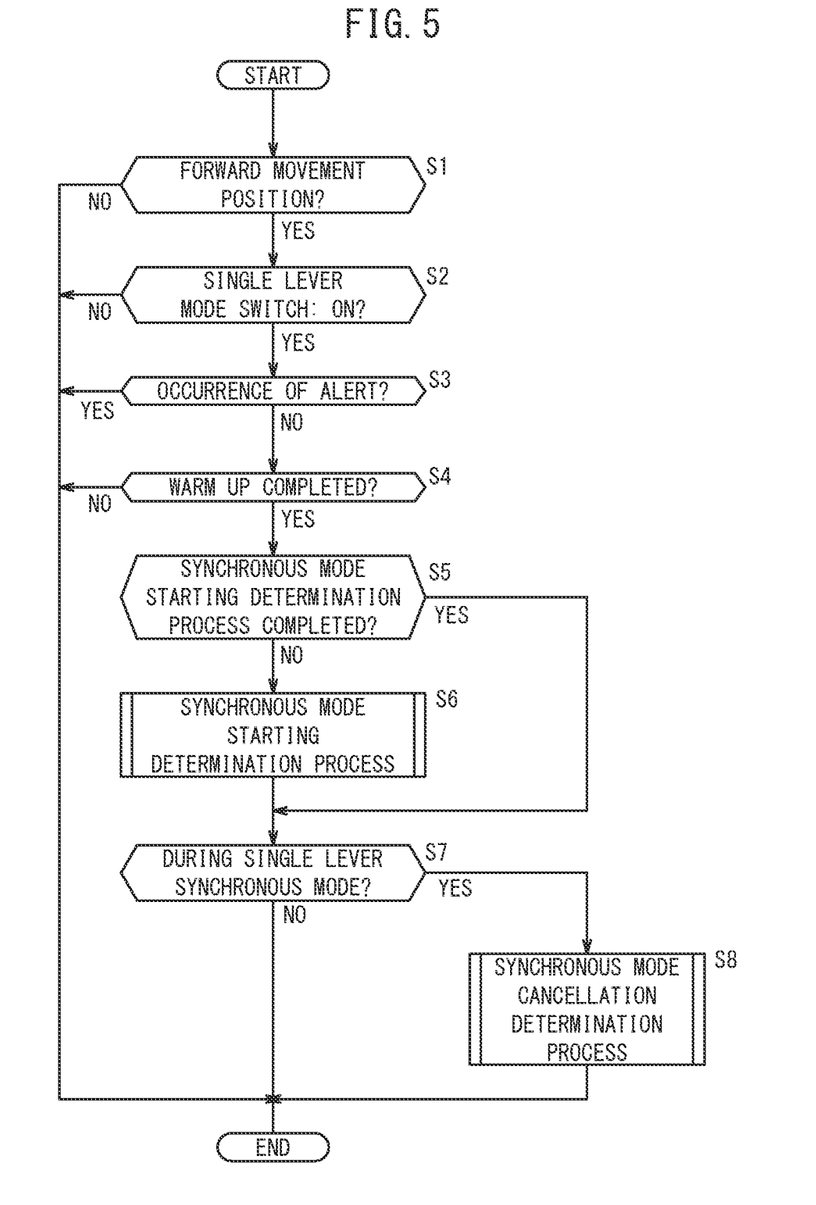
FIG. 5 is a flowchart provided to describe a mode transitioning control of the marine vessel engine rotational speed control device according to the present embodiment.

Next, in step S6f, transitioning is carried out from the single lever asynchronous mode to the single lever synchronous mode, whereupon the process proceeds to step S7 in FIG. 5.

Also in the case of step S6a: YES, step S6b: NO, step S6c: NO, and step S6d: NO, the process proceeds to step S7.

In step S7, a determination is made as to whether or not the single lever synchronous mode is set.

In step S7, in the case that the single lever synchronous mode is set (step S7: YES), the process proceeds to the single lever synchronous cancellation determination process of step S8.

Further, in the case of step S7: NO, the process returns to step S1.

Figure 7:
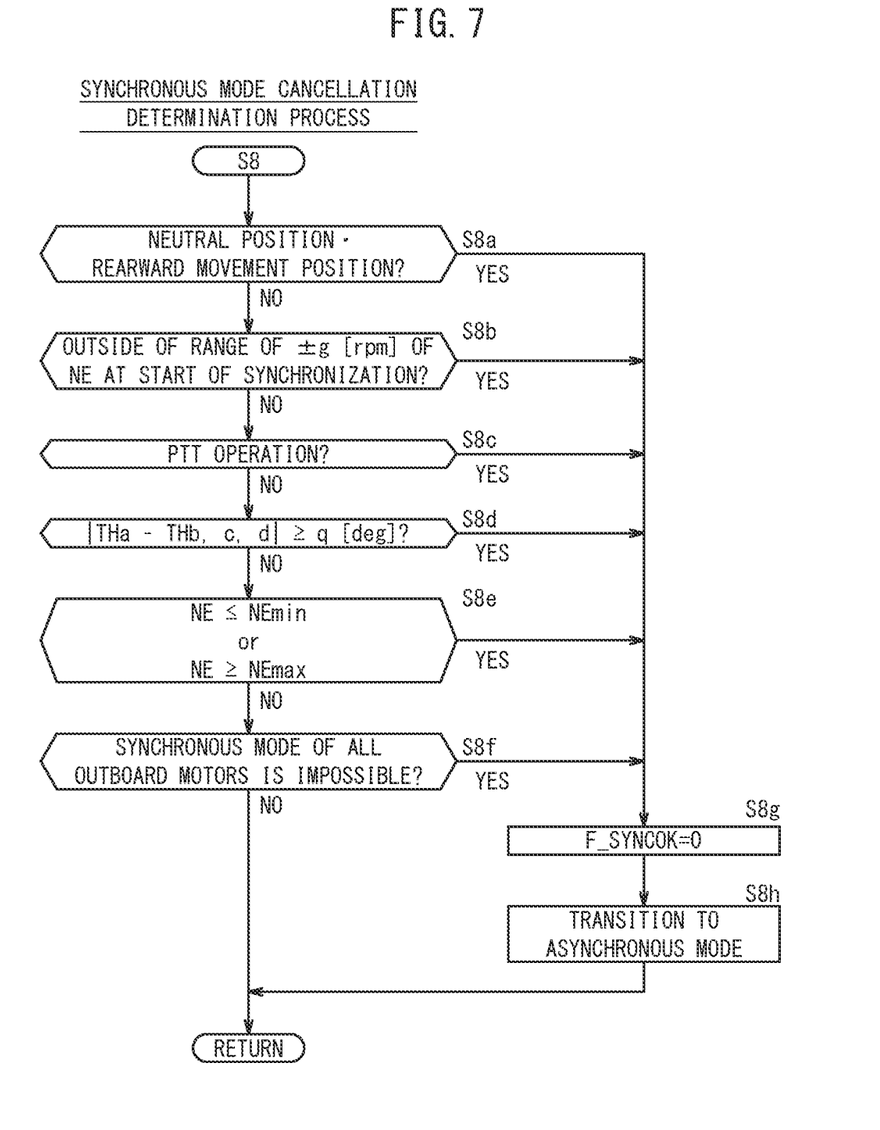
FIG. 7 is a flowchart showing details of a synchronous mode cancellation determination process shown in FIG. 5.

FIG. 7 shows a subroutine of the synchronous mode cancellation (transitioning to the asynchronous mode) determination process of step S8.

When it is detected that the position of the first lever 51 has been switched from the forward movement position to the neutral position or the rearward movement position (step S8a: YES); when it is detected that the engine rotational speeds NE become outside of the range of ±g [rpm] of the engine rotational speeds NE at the start of the synchronous mode (step S8b: YES); when operation of the PTT mechanism is detected (step S8c: YES); when a deviation (absolute value) between the throttle opening THa of the throttle valve of the outboard motor 14A and the throttle openings THb, THc, and THd of the throttle valves of the outboard motors 14B to 14D has become greater than or equal to q [deg] (|THa−THb|≥q [deg], |THa−THc|≥q [deg], or |THa−THd|≥q [deg]) (step S8d: YES); when at least one of the engine rotational speeds NEa, NEb, NEc, and Ned becomes less than or equal to NEmin=m [rpm] or greater than or equal to NEmax=n [rpm] (step S8e: YES); or when the synchronous mode of all of the outboard motors 14A to 14D has become impossible (step S8f: YES), then in step S8g, the synchronization initiation impossible flag (F_SYNCOK=0) is set, and in step S8h, the synchronous mode is canceled, and transitioning to the asynchronous mode is carried out.

Moreover, in the case that the determinations made in steps S8a to S8f are all negative, the synchronous mode is continued, and the process proceeds to step S8a.

[Inventions that can be Grasped from the Embodiment]

A description will be given below concerning the inventions that are capable of being grasped from the above-described embodiment. Moreover, in order to facilitate understanding, the reference numerals used above in relation to the constituent elements are written in parentheses, however, the constituent elements are not limited to those to which the reference numerals are applied.

The marine vessel engine rotational speed control device according to the present invention is the marine vessel engine rotational speed control device (10), the marine vessel including a plurality of outboard motors (14A to 14D) which are mounted on the hull (12) and each of which is equipped with an engine (32A to 32D), the marine vessel engine rotational speed control device comprising:

the control units (34A to 34D) which cause the respective engines (32A to 32D) of the plurality of outboard motors (14A to 14D) to transition to the synchronous mode in which the engines are controlled at the same engine rotational speed (NEa), based on operation of a change in the control, wherein the control units (34A to 34D) determine beforehand the engine (32A) to serve as a reference from among the engines (32A to 32D) of the plurality of outboard motors (14A to 14D); and when all of the engines (32A to 32D) have satisfied transitioning conditions (all of the first to ninth conditions) to transition to the synchronous mode, the control unit automatically causes transitioning to the synchronous mode in which the engine rotational speeds (NEb NEc, Ned) of the engines (32B to 32D) other than the engine (32A) serving as the reference are controlled at the engine rotational speed (NEa) of the engine (32A) serving as the reference, and automatically cancels the synchronous mode when at least one engine from among all of the engines (32A to 32D) has satisfied a cancellation condition to cancel the synchronous mode (at least one of the eleventh to twenty-first conditions).

In accordance with such a configuration, the synchronous mode is capable of being set on the basis of a simple operation. As a result, cruising navigation or the like can be stably executed based on a simple operation without imparting a sense of discomfort to the operator.

Further, when a plurality of outboard motors are mounted, all of the plurality of outboard motors (14A to 14D) are set in conformity with the same engine rotational speed, and therefore, without a sense of disparity between the engines, the sound quality (tone) of the engines (32A to 32D) is improved, and the auditory impression of the vessel occupant or the like is improved. Moreover, traveling of the vessel in a straightforward manner is improved.

Further, in the marine vessel engine rotational speed control device (10), there may be further provided the first lever (51) and the second lever (52), each of which is capable of being switched between the neutral position, the forward movement position, and the rearward movement position by a manual operation, wherein, at the forward movement position and the rearward movement position, the respective engine rotational speeds (NEa to NEd) of the plurality of outboard motors (14A to 14D) can be adjusted in accordance with the amount of operation of the first and second levers; and in the synchronous mode, a single lever mode may be set in which the engine rotational speeds (NEa to NEd) of all of the engines (32A to 32D) can be adjusted by operation of a predetermined one of the levers (51) from among the first lever (51) and the second lever (52).

In accordance with these features, in the synchronous mode, since the engine rotational speeds (NEa to NEd) of all of the engines can be adjusted by the single lever (51), navigational ease of operation is improved.

Furthermore, in the marine vessel engine rotational speed control device (10), prior to transitioning to the synchronous mode, transitioning to the single lever mode may be performed by a manual operation of the single switch (54), other than the manual operation of the first and second levers.

In accordance with this feature, execution of the synchronous mode in the single lever mode is ensured, and a feeling of the operator having performed the operation to the synchronous mode is created.

Further still, in the marine vessel engine rotational speed control device (10), the single switch (54) may be an ON/OFF switch (54); and transitioning to the single lever mode may be performed when the first lever (51) and the second lever (52), respectively, are in the neutral position, and the ON/OFF switch (54) is in the ON position.

In accordance with such a configuration, by operation of the ON/OFF switch (54), the operator can be made to recognize (be made aware of) transitioning to the single lever mode, and by extension, transitioning to the synchronous mode.

Still further, in the marine vessel engine rotational speed control device (10), on condition that the single lever mode is set, the transitioning condition for all of the engines (32A to 32D) to transition to the synchronous mode may be that the predetermined one lever (51) is in the forward movement position, all of the engines (32A to 32D) are in a state after being warmed up, the engine rotational speeds (NEa to NEd) of all of the engines (32A to 32D) lie within a predetermined range, the throttle openings (THa to THd) of all of the engines (32A to 32D) are greater than or equal to a predetermined opening, and a normal state is indicated by the alert sensors (42A to 42D).

In accordance with such a configuration, in the synchronous mode, traveling of the vessel in a straightforward manner is improved.

Still further, in the marine vessel engine rotational speed control device (10), the transitioning condition for all of the engines (32A to 32D) to transition to the synchronous mode may be that a variation in the forward movement position of the predetermined one lever (51) lies within a predetermined variation within a predetermined time period.

In accordance with such a configuration, it is possible to transition to the synchronous mode at a time when stable forward navigation is being carried out.

Furthermore, the single switch (54) forms the remote control box (22) integrally with the first lever (51) and the second lever (52).

In accordance with this feature, it is possible to transition to the single lever mode (single lever asynchronous mode) with satisfactory operability. Further, the single lever mode (single lever asynchronous mode) can be returned to the normal mode.

The marine vessel engine rotational speed control device according to the present invention is not limited to the above-described embodiments, and it is a matter of course that various alternative embodiments could be adopted therein without departing from the essence and gist of the present invention as set forth in the appended claims.

DESCRIPTION OF REFERENCE NUMERALS

10 . . . Marine Vessel Engine Rotational Speed Control Device
12 . . . Hull
14 . . . Outboard Motors
20 . . . Marine Vessel
22 . . . Remote Control Box
26 . . . Remote Control ECU
32 . . . Engines
34 . . . Outboard Motor ECUs
42 . . . Alert Sensors
51 . . . First Lever
52 . . . Second Lever
54 . . . Single Lever Mode Switch

The invention claimed is:

1. A marine vessel engine rotational speed control device, a marine vessel including a plurality of outboard motors which are mounted on a hull and each of which is equipped with an engine, the marine vessel engine rotational speed control device comprising:

a control unit configured to cause each of the engines of the plurality of outboard motors to transition to a synchronous mode in which the engines are controlled at a same engine rotational speed, based on operation of a change in control, wherein each of the engines is configured to be switched between a neutral position, a forward movement position, and a rearward movement position by a manual operation, and a first lever and a second lever configured to adjust the respective engine rotational speeds of the plurality of outboard motors in accordance with an amount of operation of the first and second levers at the forward movement position and the rearward movement position, wherein:

the control unit determines beforehand an engine to serve as a reference from among the engines of the plurality of outboard motors; and when all of the engines have satisfied a transitioning condition to transition to the synchronous mode, the control unit automatically causes transitioning to the synchronous mode in which engine rotational speeds of the engines other than the engine serving as the reference are controlled at an engine rotational speed of the engine serving as the reference, in the synchronous mode, a single lever mode is set in which the engine rotational speeds of all of the engines are allowed to be adjusted by operation of a predetermined one of the first lever and the second lever, and the control unit automatically cancels the synchronous mode when at least one engine from among all of the engines has satisfied at least one cancellation condition that is different from the transitioning condition to transition to the synchronous mode.

2. The marine vessel engine rotational speed control device according to claim 1, wherein, prior to transitioning to the synchronous mode, transitioning to the single lever mode is performed by a manual operation of a single switch, other than the manual operation of the first and second levers.

3. The marine vessel engine rotational speed control device according to claim 2, wherein:

the single switch is an ON/OFF switch; and transitioning to the single lever mode is performed when the first lever and the second lever, respectively, are in the neutral position, and the ON/OFF switch is in an ON position.

4. The marine vessel engine rotational speed control device according to claim 3, wherein:

on condition that the single lever mode is set, the transitioning condition for all of the engines to transition to the synchronous mode is that the predetermined one lever is in the forward movement position, all of the engines are in a state after being warmed up, the engine rotational speeds of all of the engines lie within a predetermined range, throttle openings of all of the engines are greater than or equal to a predetermined opening, and a normal state is indicated by an alert sensor.

5. The marine vessel engine rotational speed control device according to claim 4, wherein the transitioning condition for all of the engines to transition to the synchronous mode is that a variation in the forward movement position of the predetermined one lever lies within a predetermined variation within a predetermined time period.

6. The marine vessel engine rotational speed control device according to claim 2, wherein the single switch forms a remote control box integrally with the first lever and the second lever.

* * * * *